United States Patent [19]

Gebhardt

[11] Patent Number: 4,488,447
[45] Date of Patent: Dec. 18, 1984

[54] POWER TAKE-OFF OF AN INTERNAL COMBUSTION ENGINE

[75] Inventor: Hans Gebhardt, Langenzenn, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 394,703

[22] Filed: Jul. 2, 1982

[30] Foreign Application Priority Data

Jul. 3, 1981 [DE] Fed. Rep. of Germany ....... 3126243

[51] Int. Cl.³ .................... F16H 35/06; F16H 3/08
[52] U.S. Cl. ........................... 74/397; 74/325; 74/393; 74/15.63
[58] Field of Search ............. 74/393, 397, 325, 15.63; 123/198 C

[56] References Cited

U.S. PATENT DOCUMENTS

| 1,198,869 | 9/1916 | Pierce | 74/397 X |
| 1,226,559 | 5/1917 | Mason | 74/397 X |
| 2,636,390 | 4/1953 | Wagner | 74/397 X |
| 3,399,582 | 9/1968 | Henry | 74/397 X |
| 3,781,137 | 12/1973 | Engstrom | 74/15.63 X |
| 3,793,899 | 2/1974 | Bourbonnaud | 74/397 |
| 4,249,993 | 2/1981 | Stegelitz et al. | 74/397 X |

FOREIGN PATENT DOCUMENTS

| 2355911 | 5/1974 | Fed. Rep. of Germany | 74/325 |
| 2302800 | 12/1982 | Fed. Rep. of Germany | . |
| 1271394 | 10/1960 | France | 74/397 |
| 1335644 | 7/1962 | France | 74/397 |

Primary Examiner—Allan D. Herrmann
Assistant Examiner—Dirk Wright
Attorney, Agent, or Firm—Becker & Becker, Inc.

[57] ABSTRACT

A power take-off of an internal combustion engine, typically an Otto-cycle or Diesel engine, for auxiliary machines, such as compressors, pumps, etc., with the input shaft of the auxiliary machine being drivingly connected with the output shaft of the internal combustion engine via gears. To change the step-up/step-down ratio, the shaft center spacing between the input shaft of the auxiliary machine and the output shaft of the internal combustion engine is variable in a manner that the drive pinion is supported in an eccentric bearing bushing which, in turn, is arranged axially displaceably and rotatably in a flanged housing. The eccentric bearing bushing has a flanged part having axial holes to alternatively accept a locating pin.

6 Claims, 3 Drawing Figures

POWER TAKE-OFF OF AN INTERNAL COMBUSTION ENGINE

The present invention relates to a power take-off of an internal combustion engine, typically an Otto-cycle or Diesel engine, such as may be used for driving auxiliary machines, such as compressors, pumps, lighting generators, etc., with the input shaft of the auxiliary machine being drivingly connected with the output shaft of the internal combustion engine by means of gears.

It is known, in the case of engine plants of vehicles, ships, generating sets, and industrial plants, to take power from the engine to drive auxiliary machines, such as hydraulic pumps for power applications and power-assisted steering systems, compressors for brakes and air conditioning plants, lighting generators, etc. A usual type of drive is the V-belt drive with V-belt pulleys arranged at the fan end of the engine. For reasons of reliability, customers increasingly call for maintenance-free power take-offs. These power take-offs are driven in a known manner by gears and, for the sake of simplicity, can be integrated in the timing gear train, their location being either at the flywheel end or fan end, depending on the location of the timing gear train. If, for instance, a gear pump of a defined size is to be used for a hydraulic pump system, the designer, in order to fully utilize the delivery capability of the pump, will determine the power take-off step-down or step-up ratio for a corresponding rated engine speed on the basis of the pump speed specified in the catalogues. Since, in the case of industrial engines, different customers, from the viewpoints of gearbox used, engine service life, and engine noise level, will call for widely different rated engine speeds, the originally defined rated pump speed and, consequently, the delivery rate, will no longer be obtained if the same hydraulic pump size is used. In such a case, it is necessary either to adopt a pump with a higher capacity, using the same step-up/step-down ratio of the transmission gears, or interchangeable sets of gears would have to be available for the various rated engine speeds. In either case, the costs of the power take-off would increase.

It is an object of the present invention to provide a power take-off of an internal combustion engine which makes it possible in a simple manner to provide an optimum and cost-effective drive of an auxiliary machine for a range of several rated engine speeds. At the same time, the layout of the power take-off is required to be straightforward, maintenance-free, and quick to convert.

This object, and other objects and advantages of the present invention, will appear more clearly from the following specification in connection with the accompanying drawings, in which.

The power take-off according to the present invention is characterized primarily in that the shaft spacing or distance between the center of the input shaft of the auxiliary machine and the center of the output shaft of the internal combustion engine can be varied in order to change the step-up/step-down ratio.

Thus, the power take-off according to the invention comprises inter-meshing gears which, on the one hand, are connected to the input shaft of the auxiliary machine and, on the other hand, to the output shaft of the internal combustion engine, the distance between the shaft centers being capable of being varied in order to change the step-up/step-down ratio. This variability of the shaft center spacing is achieved according to a further development of the concept underlying the present invention in that an eccentric bearing bushing is provided to support the auxiliary machine and its pinion, with the bushing being axially displaceable and rotatable in a flanged housing. The flanged housing, in turn, may, for instance, be flanged to the housing of the timing gear train.

In order to facilitate manipulation, the eccentric bearing bushing is provided with a flanged part having axial holes. At the same time, a pin is provided in one end of the flanged housing facing the interior of the casing, said pin projecting from the end into one of the axial holes provided in the flanged part.

Adjustment of the shaft center distance is effected by rotating the eccentric bearing bushing and locating it by means of a flange hole and the pin.

The gears which determine the step-up/step-down ratio are a set of mating gears, including a pinion connected non-rotatingly, yet axially displaceably, with the input shaft of the auxiliary machine, and a gear wheel connected non-rotatingly and non-displaceably with the output shaft of the internal combustion engine.

Mounting of the pinion in the eccentric bearing bushing may be by a plain or sleeve bearing, or by an anti-friction bearing.

According to a further development of the concept of the present invention, the power take-off may be of the shaft-mounted type or side-flanging type.

Figure 1:
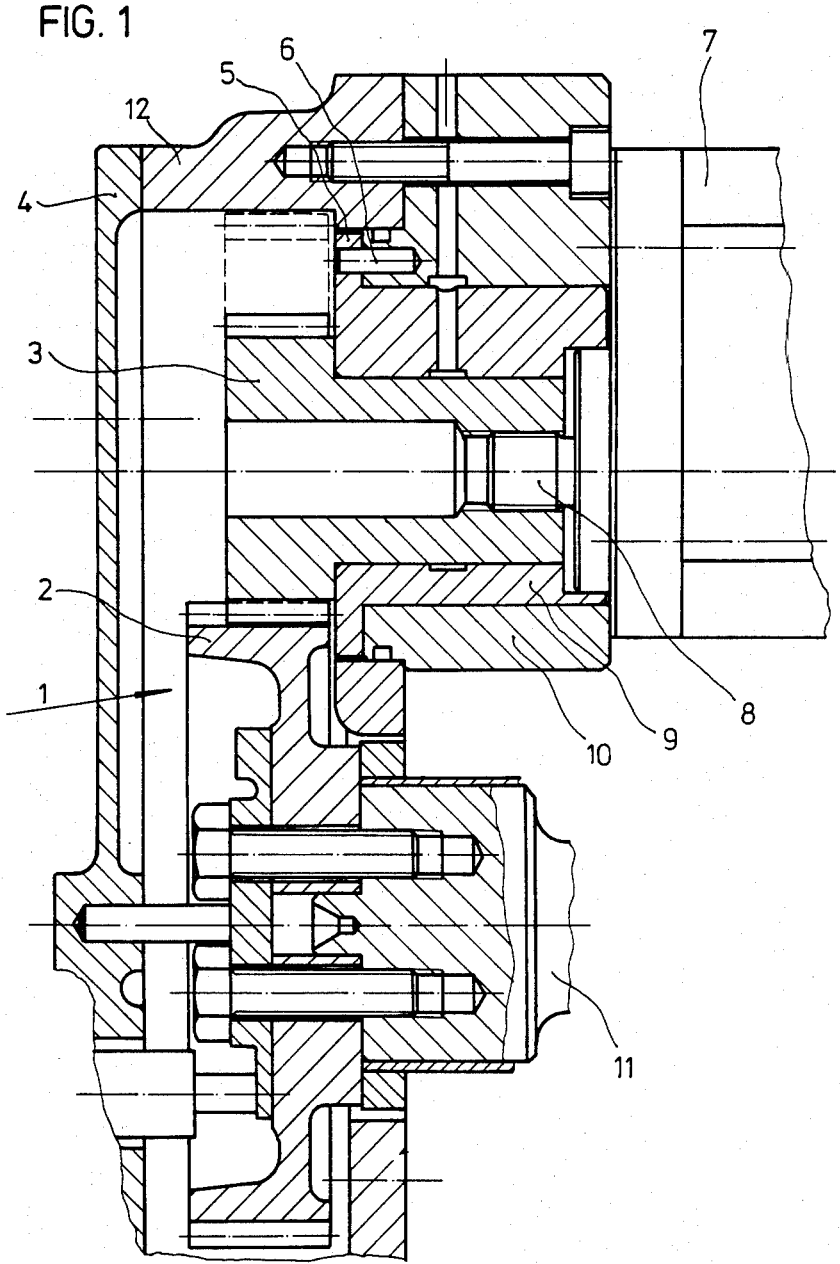
FIG. 1 is an axial section through one inventive embodiment of a power take-off.
Figure 2:
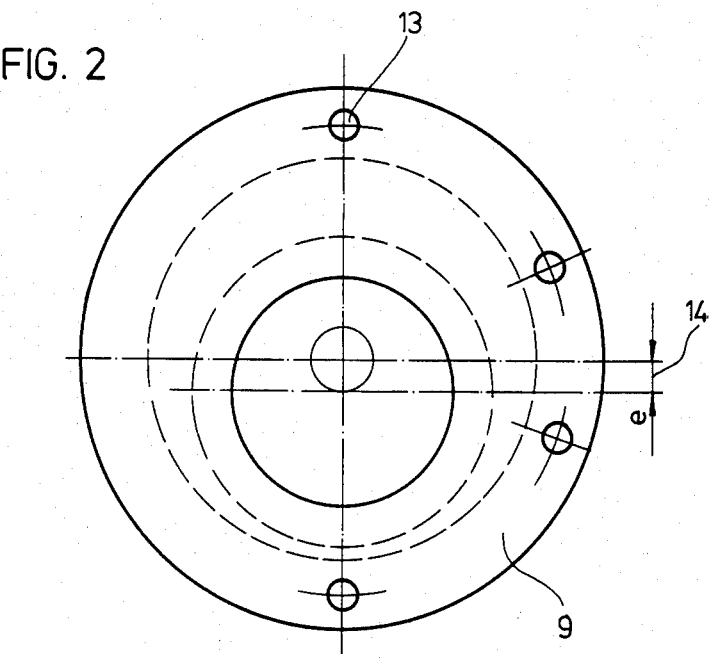
FIG. 2 is an elevation of the flanged part of the eccentric bearing bushing.
Figure 3:
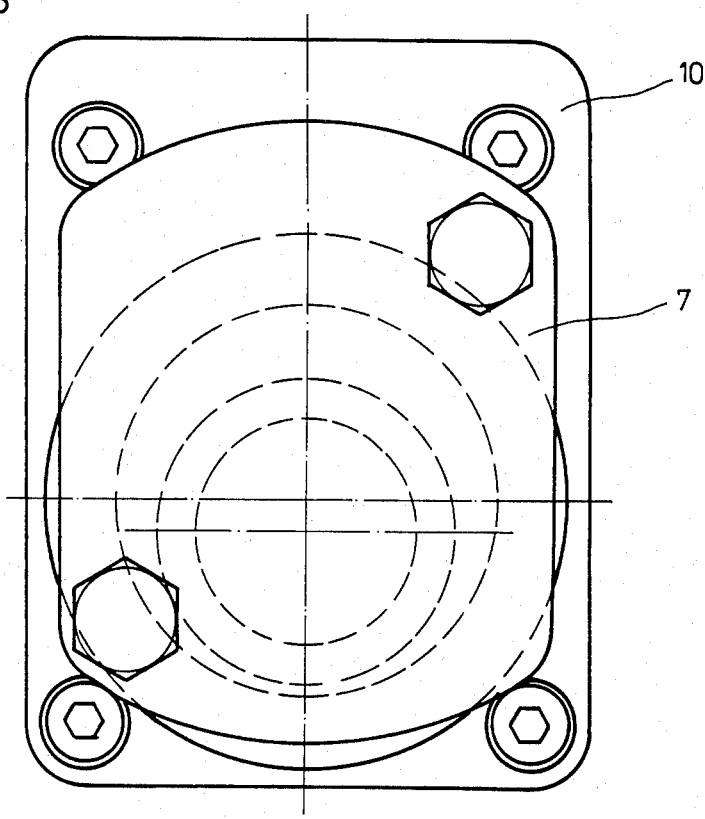
FIG. 3 is an elevation of the auxiliary machine and flanged housing.

Referring now to the drawings in detail, FIG. 1 shows the power take-off 1 arranged in the housing or casing 12 of a timing gear train. Extending into this casing 12 is the output shaft 11 of the internal combustion engine, with a gear 2 being mounted in a manner known per se to the front end of the output shaft by means of a centering pin and screws. This gear 2, in turn, is drivingly connected with a pinion 3 which is mounted non-rotatingly yet axially displaceably on an input shaft 8 of an auxiliary machine 7 via keys, keyways, or similar arrangements. That end of the pinion 3 facing the auxiliary machine has a shaft-like configuration by means of which it is supported in the inner bore of an eccentric bearing bushing 9. The eccentric bearing bushing 9, the inner bore of which is formed eccentrically to its outer surface in such a way that an eccentricity 14 is provided (FIG. 2), is formed at its one end with a flanged part 5 in which axial holes 13 are provided. The eccentric bearing bushing 9, in turn, is arranged rotatably and displaceably in a flanged housing 10. The flanged housing 10, in turn, is flanged to the casing 12 in such a way the the flanged part 5 of the eccentric bearing bushing 9 faces the interior of the casing 12. At that end of the flanged housing 10 facing into the interior of the casing there is provided a pin 6 which projects out of this end and into one of the holes 13 of the flanged part 5. By means of this pin 6, the flanged part 5 is fixed in its angular position and, consequently, with the predetermined amount of eccentricity of the eccentric bearing bushing. In order to permit quick and unproblematic relocation of the eccentric bearing bushing 9, as well as replacement of the gear 3, the casing 12 is closed at the end opposite the machines or engines with a detachable cover 4.

The power take-off according to the invention offers the advantage that, where different pinions are used, the combination of, say, three pinion tooth numbers for one shaft center spacing with four different eccentric bearing bushing locations, step-down and step-up ratios relative to the crankshaft can be obtained in a range of from 0.81 to 1.16. With a suitable design, these values can be varied in respect to location and range to suit the specific application.

Modification of the power take-off or, rather, varying the shaft center spacing and, consequently, the step-up or step-down ratio of the power take-off, is effected by the following procedure:

First, the cover 4 is removed from the casing 12. The pinion 3 is then withdrawn axially from its bearing. Subsequently, the eccentric bearing bushing 9 is also withdrawn axially from its seat in the flanged housing 10, and is then turned in such a way that the hole 13 corresponding to the eccentricity now required coincides with the pin 6. The eccentric bearing bushing 9 is now again inserted axially in its seat in the flanged housing 10 until the pin 6 extends through the hole 13 in such a way that the rear end of the flanged part 5 fully contacts the front end of the flanged housing 10. The pinion 3 corresponding to the new shaft center spacing is then inserted or slid on in the bearing bore of the center bearing bushing 9 and, simultaneously, on the input shaft 8 of the auxiliary machine 7. The cover 4 can now be screwed on the casing 12 again, and the readjusted power take-off can be placed into operation.

The present invention is, of course, in no way restricted to the specific disclosure of the specification and drawings, but also encompasses any modifications within the scope of the appended claims.

What I claim is:

1. A power take-off of an internal combustion engine such as Otto- and Diesel motors for driving an auxiliary machine such as a compressor, pump and the like, with said internal combustion engine being provided with an output shaft, and said auxiliary machine being provided with an input shaft, said power take-off comprising gear means for drivingly connecting said input shaft of said auxiliary machine with said output shaft of said internal combustion engine; with the spacing between said input shaft and said output shaft being variable in order to change the step-up/step-down ratio, a flanged housing, and an eccentric bearing bushing arranged in said flanged housing in such a way as to be axially displaceable and rotatable; said gear means including a drive gear subject to retention and a pinion mounted on said input shaft of said auxiliary machine, said pinion being supported in said eccentric bearing bushing for effecting said variability of said shaft spacing.

2. A power take-off according to claim 1, in which said eccentric bearing bushing is provided with a flanged part having axial holes.

3. A power take-off according to claim 2, which includes a pin on one end face of said flanged housing, said pin being adapted to project into one of said axial holes of said flanged part of said eccentric bearing bushing.

4. A power take-off according to claim 1, in which said gear means is a set of mating gears, including a first gear which is said pinion connected non-rotatingly with said input shaft of said auxiliary machine but also said first gear which is said pinion being displaceable with respect to said input shaft of said auxiliary machine, and a second gear which is said drive gear connected non-rotatingly and non-displaceably with said output shaft of said internal combustion engine.

5. A power take-off according to claim 1, in which support of said pinion in said eccentric bearing bushing is effected by a sleeve bearing.

6. A power take-off according to claim 1, in which support of said pinion in said eccentric bearing bushing is effected by an anti-friction bearing.

* * * * *